United States Patent [19]

Endo

[11] Patent Number: 5,115,719
[45] Date of Patent: May 26, 1992

[54] PNEUMATIC BOOSTER

[75] Inventor: Mitsuhiro Endo, Kanagawa, Japan

[73] Assignee: Tokico Ltd., Kanagawa, Japan

[21] Appl. No.: 671,966

[22] Filed: Mar. 18, 1991

[30] Foreign Application Priority Data

Mar. 19, 1990 [JP] Japan .................................. 2-69199

[51] Int. Cl.⁵ .............................................. F15B 9/10
[52] U.S. Cl. .................................. 91/376 R; 91/533; 92/48; 92/96
[58] Field of Search ............... 91/533, 376 R; 92/48, 92/96, 98 R, 101, 162 R, 165 R

[56] References Cited

U.S. PATENT DOCUMENTS

| 4,664,016 | 5/1987  | Tobisawa et al. | 91/376 R |
| 4,787,292 | 11/1988 | Tsuyuki et al.  | 91/376 R |
| 4,944,214 | 7/1990  | Briggs          | 92/96    |
| 4,995,302 | 2/1991  | Suzuki et al.   | 91/376 R |
| 5,029,515 | 7/1991  | Endo            | 91/533   |
| 5,046,399 | 9/1991  | Koshimizu       | 91/376 R |

FOREIGN PATENT DOCUMENTS 55-152654 11/1980 Japan.

*Primary Examiner*—Edward K. Look
*Assistant Examiner*—Hoang Nguyen
*Attorney, Agent, or Firm*—Wenderoth, Lind & Ponack

[57] ABSTRACT

A pneumatic booster for use, for example, in a brake system of a vehicle, and designed so that the overall axial length is reduced without interfering with the operation thereof. The booster comprises a valve body which is movable back and forth between first and second positions in a housing that is divided by a diaphragm with a power piston into front and rear chambers communicated with respective pressure sources, a valve which allows at least one of the front and rear chambers to selectively communicate with the pressure sources which differ from each other in the level of pressure, and a guide which slidably fits on the outer periphery of the valve body. The valve body has a passage one end of which opens on the outer periphery thereof to connect one of the front and rear chambers to the associated pressure source, the opening of the passage being positioned in the axial direction of the valve body so that the guide overlaps the opening when the valve body is at either the first or second position. The guide has a guide member and a seal member. The guide member has a plurality of axial grooves provided in the inner periphery thereof at predetermined spacings in the circumferential direction so that the passage communicates with the one chamber through the grooves when the valve body is at either the first or second position where the guide overlaps the opening.

17 Claims, 3 Drawing Sheets

PNEUMATIC BOOSTER

BACKGROUND OF THE INVENTION

1. Field of the Invention

The present invention relates to a pneumatic booster for use, for example, in a brake system of a vehicle, for example, an automobile.

2. Description of the Prior Art

These days, many automobiles are equipped with a pneumatic booster which is designed to boost brake pedal pressure by utilizing a pressure difference between a suction pressure produced in an engine and an atmospheric pressure, thereby increasing a braking hydraulic pressure generated in a master cylinder, and thus making it possible to obtain a great braking force with a relatively slight brake pedal pressure.

One example of such a pneumatic booster will be explained with reference to FIG. 1. The pneumatic booster 1, which is of the tandem type, has a housing 4 that comprises a front shell 2 and a rear shell 3. The interior of the housing 4 is divided by a center shell 5 into a pair of front and rear chambers 6 and 7. The front chamber 6 is divided by a front power piston 9 with a front diaphragm 8 into a front constant-pressure chamber 10 and a front variable-pressure chamber 11. Similarly, the rear chamber 7 is divided by a rear power piston 13 with a rear diaphragm 12 into a rear constant-pressure chamber 14 and a rear variable-pressure chamber 15. The constant-pressure chambers 10 and 14 are communicated with a negative pressure source (not shown) so as to be placed under a negative pressure.

The power pistons 9 and 13 are secured to a valve body 16, to which is connected an output rod 17. In addition, a plunger 19 that is connected to an input rod 18 is slidably inserted into the valve body 16. The valve body 16 incorporates a breather valve 20 and a vacuum valve 21. The breather valve 20 allows the variable-pressure chambers 11 and 15 to communicate with the atmosphere when the input rod 18 moves forwardly relative to the valve body 16, whereas the vacuum valve 21 allows the variable-pressure chambers 11 and 15 to communicate with the constant-pressure chambers 10 and 14 when the input rod 18 moves rearwardly relative to the valve body 16.

With this arrangement, when the brake pedal is stepped on, the input rod 18 moves forwardly to open the breather valve 20, so that atmospheric air is introduced into the front and rear variable-pressure chambers 15 and 11 to produce a differential pressure between each of the constant-pressure chambers 10 and 14 and the corresponding one of the variable-pressure chambers 11 and 15, causing the power pistons 9 and 13 to move forwardly. In consequence, the valve body 16 is moved forwardly with great force, thereby transmitting a boosted thrust force to the output rod 17.

Incidentally, with increased engine output being demanded, engines are increasing in size thus imposing a great restriction on available space inside an engine compartment. For this reason, parts in an engine compartment are desired to be reduced in size which requirement equally applies to a pneumatic booster without any lowering in performance.

In the above-described pneumatic booster 1, however, any reduction in the radial dimension (i.e., the outer diameter) has a great effect on the pressure-receiving area of each of the power pistons 9 and 13, which may lead to a lowering in the performance. For this reason, the radial dimension of the pneumatic booster cannot be reduced. It is therefore demanded to reduce the axial length of the pneumatic booster.

SUMMARY OF THE INVENTION

Under these circumstances, it is an object of the present invention to provide a pneumatic booster wherein the axial length of the valve body is reduced to achieve a reduction in the overall axial length of the apparatus.

To this end, the present invention provides a pneumatic booster comprising: a housing; a diaphragm with a power piston which is attached at the outer peripheral portion to the housing to divide the interior of the housing into a pair of front and rear chambers, which are communicated with respective pressure sources; a valve body which is movable back and forth between first and second positions in the housing, the valve body having the inner peripheral portion of the diaphragm attached to the outer periphery thereof; an input rod; a valve which cooperates with the input rod to effect a switching operation to allow at least one of the front and rear chambers to selectively communicate with the pressure sources which are different from each other in the level of pressure; an output rod which is connected at one end thereof to the power piston; and a guide which is provided on the housing to slidably fit on the outer periphery of the valve body; the valve body being formed therein with a passage that constitutes a part of a passage system for connecting one of the front and rear chambers to the pressure source associated therewith, one end of the passage opening on the outer periphery of the valve body so that the passage can communicate with the one chamber; the opening of the passage being positioned in the axial direction of the valve body so that the guide overlaps the opening when the valve body is at either the first or second position; the guide having a guide member that fits on the outer periphery of the valve body to slidably support it, and a seal member that fits on the outer periphery of the valve body slidably and hermetically; the guide member having a plurality of axial grooves provided in the inner peripheral surface thereof at predetermined spacings in the circumferential direction so that the passage communicates with the one chamber through the grooves when the valve body is at either the first or second position where the guide overlaps the opening.

In addition, the present invention provides a pneumatic booster comprising: a housing; a diaphragm with a power piston which is attached at the outer peripheral portion to the housing to divide the interior of the housing into a constant-pressure chamber that is communicated with a negative pressure source and a variable-pressure chamber that is selectively communicated with the negative pressure source or the atmosphere by a switching operation; a valve body which is movable back and forth in the housing between the extremity of its forward travel and the extremity of its rearward travel, the valve body having the inner peripheral portion of the diaphragm attached to the outer periphery thereof; an input rod; a valve which is provided in the valve body to cooperate with the input rod to effect a switching operation to allow the variable-pressure chamber to selectively communicate with the negative pressure source or the atmosphere; an output rod which is connected at one end thereof to the power piston; and a guide which is provided on the housing to slidably fit on the outer periphery of the valve body; the valve body being formed therein with a passage one end of which opens to the outer periphery of the valve body to provide communication between the variable-pressure chamber and the valve; the opening of the passage being positioned in the axial direction of the valve body so that the guide overlaps the opening when the valve body is at the extremity of its rearward travel; the guide having a guide member that fits on the outer periphery of the valve body to slidably support it, and a seal member that fits on the outer periphery of the valve body slidably and hermetically; the guide member having a plurality of axial grooves provided in the inner peripheral surface thereof at predetermined spacings in the circumferential direction so that the passage communicates with the variable-pressure chamber through the grooves when the valve body is at the extremity of its rearward travel where the guide overlaps the opening.

In addition, the present invention provides a pneumatic booster comprising: a housing having a center plate that divides the interior thereof into a front chamber and a rear chamber; diaphragms with respective power pistons which are attached at the outer peripheral portions thereof to the housing to divide each of the front and rear chambers into a constant-pressure chamber that is communicated with a negative pressure source and a variable-pressure chamber that is selectively communicated with the negative pressure source or the atmosphere by a switching operation; a valve body which is movable back and forth in the housing between the extremity of its forward travel and the extremity of its rearward travel, the valve body having the respective inner peripheral portions of the diaphragms attached to the outer periphery thereof; an input rod; a valve which is provided in the valve body to cooperate with the input rod to effect a switching operation to allow the variable-pressure chamber in each of the front and rear chambers to selectively communicate with the negative pressure source or the atmosphere; an output rod which is connected at one end thereof to the power pistons; and a guide which is provided on the housing to slidably fit on the outer periphery of the valve body; the valve body being formed therein with a passage one end of which is communicated with the constant-pressure chamber in the front chamber and the other end of which opens to the outer periphery of the valve body to communicate with the constant-pressure chamber in the rear chamber; the guide being attached to an opening provided in the center plate; the opening of the passage being positioned in the axial direction of the valve body so that the guide overlaps the opening when the valve body is at the extremity of its forward travel; the guide having a guide member that fits on the outer periphery of the valve body to slidably support it, and a seal member that fits on the outer periphery of the valve body slidably and hermetically; the seal member having a plurality of axial grooves provided in the inner peripheral surface thereof at predetermined spacings in the circumferential direction so that the passage communicates with the constant-pressure chamber in the rear chamber through the grooves when the valve body is at the extremity of its forward travel.

By virtue of the above-described arrangement, the guide member that guides the valve body overlaps the opening of the passage, so that the axial length of the valve body can be reduced by an amount corresponding to the overlap while the valve body is supported over a length sufficient to guide it. Accordingly, it is possible to reduce the overall axial length of the pneumatic booster. Since the required communication is ensured through the communicating passage provided in the guide member even when the guide member overlaps the opening of the passage, there is no interference with the operation of the pneumatic booster.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Figure 3:
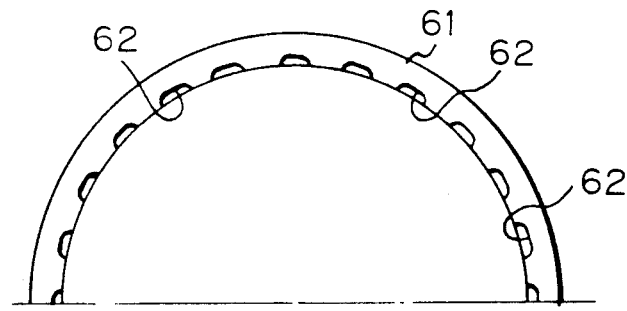
FIG. 3 is a sectional view taken along the line 3—3 of FIG. 2.
Figure 4:
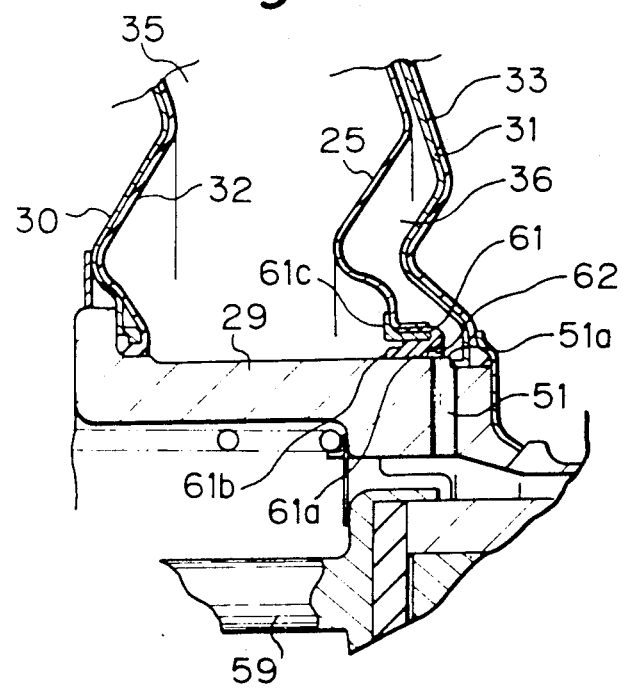
FIG. 4 is a fragmentary sectional view showing an essential part of the first embodiment when a valve body of the pneumatic booster is at the extremity of its forward travel.

A first embodiment of the present invention will be described below with reference to FIGS. 2 to 4.

In this embodiment, the present invention is exemplarily applied to a tandem type pneumatic booster 22, which has a front shell 23 and a rear shell 24 that are connected at the outer peripheries thereof through a center plate 25 by means of caulking to form a housing 26. The interior of the housing 26 is divided by the center plate 25 into a pair of front and rear chambers 27 and 28. The housing 26 is provided with a valve body 29 which is movable through the axes of the rear shell 24 and the center plate 25. Power pistons 30 and 31 and diaphragms 32 and 33 are secured at their inner peripheries to the front half (i.e., the left-hand half as viewed in FIG. 2) of the valve body 29 in correspondence to the two chambers 27 and 28, respectively. The outer peripheries of the diaphragms 32 and 33 are secured to the housing 26. With this arrangement, the front chamber 27 in the housing 26 is divided into a front constant-pressure chamber 34 and a front variable-pressure chamber 35, and the rear chamber 28 is similarly divided into a rear constant-pressure chamber 36 and a rear variable-pressure chamber 37. The front constant-pressure chamber 34 is provided with a negative pressure inlet pipe 38 for connecting together a negative pressure source (not shown), for example, an intake manifold, and the front constant-pressure chamber 34.

The rear half of the valve body 29 is formed with a cylindrical portion 39, which has a large inner-diameter portion 40 and a small inner-diameter portion 41, which are formed therein in the mentioned order from the rear end. The small inner-diameter portion 41 is slidably fitted with a plunger 43 that is connected to one end of an input rod 42 extending through the large inner-diameter portion 40 from the rear side (i.e.; the right-hand side as viewed in FIG. 2). The other end of the input rod 42 is connected to a brake pedal (not shown).

The small inner-diameter portion 41 of the valve body 29 is formed with a radial bore 44, while the plunger 43 is formed with a groove 45 in correspondence to the position of the bore 44, and a stop key 46 is disposed in the bore 44 and the groove 45 for limiting the movement of the plunger 43 relative to the valve body 29 within a predetermined range.

A first valve seat 47 is formed on the step portion between the large inner-diameter portion 40 and the small inner-diameter portion 41 of the valve body 29, and a second valve seat 48 is formed at the rear end of the plunger 43. A valve member 49 is disposed in the large inner-diameter portion 40 in such a manner as to be capable of coming into and out of contact with the valve seats 47 and 48.

The valve body 29 is formed with a passage 50 one end of which opens into the front constant-pressure chamber 34 and the other end of which opens inside the large inner-diameter portion 40 at a position which is rearward of the first valve seat 47. The intermediate portion of the passage 50 is connected with a negative pressure passage 51 that opens on the outer peripheral surface of the valve body 29 to communicate with the rear constant-pressure chamber 36. In addition, the valve body 29 is formed with a passage 52 one end of which opens inside the cylindrical portion 39 at a position forward of the first valve seat 47 and the other end of which opens on the outer peripheral surface of the cylindrical portion 39 to communicate with the rear variable-pressure chamber 37, and a passage 53 one end of which opens into the rear variable-pressure chamber 37 and the other end of which opens into the front variable-pressure chamber 35.

When the valve member 49 and the second valve seat 48 separate from each other, atmospheric air can be introduced into the variable-pressure chambers 35 and 37 through the passages 52 and 53. Thus, the valve member 49 and the second valve seat 48 constitute in combination a breather valve 54. On the other hand, when the valve member 49 and the first valve seat 47 separate from each other, the variable-pressure chambers 35 and 37 and the constant-pressure chambers 34 and 36 can be communicated with each other through the passages 50, 52 and 53 and the negative pressure passage 51. Thus, the valve member 49 and the first valve seat 47 constitute in combination a vacuum valve 55.

Between the valve member 49 and the input rod 42 is disposed a conical spring 56 that biases the valve member 49 toward the valve seats 47 and 48, and between the valve body 29 and the input rod 42 is disposed a conical spring 57 that biases the input rod 42 rearwardly. In addition, a return spring 58 is disposed in the front constant-pressure chamber 34 to bias the valve body 29 rearwardly.

An output rod 59 is connected to the forward end of the valve body 29. A reaction disk 60 is disposed between the valve body 29 and the output rod 59 to control the reaction force from the master cylinder.

A guide member 61 is attached to the inner periphery of the center plate 25 to be in sliding contact with the outer periphery of the front half of the valve body 29. The guide member 61, which is formed from a resilient material, for example, a rubber material, comprises a guide portion 61a that guides the valve body 29 and a seal portion 61b that seals the sliding contact surface of the guide portion 61a. The guide member 61 is reinforced by a reinforcing ring 61c. The positional relationship between the valve body 29 and the guide member 61 is set so that, when the valve body 29 advances as far as the extremity of its forward travel, the guide member 61 overlaps, at least partially, the opening 51a of the negative pressure passage 51 that is formed in the valve body 29 (see FIG. 4). The guide portion 61a of the guide member 61, which is in sliding contact with the valve body 29, is formed with a communicating passage 62 to provide communication between the negative pressure passage 51 and the rear constant-pressure chamber 36 when the guide member 61 overlaps the opening 51a. The communicating passage 62 comprises a plurality of axial grooves which are formed in the inner periphery of the guide member 61 at predetermined spacings in the circumferential direction, as shown in FIG. 3.

A guide member 63 is attached to the inner periphery of the rear end of the rear shell 24 in such a manner as to be in sliding contact with the cylindrical portion 39. The guide member 63, which is formed from a resilient material, for example, a rubber material, comprises a guide portion 63a that supports the cylindrical portion 39 and guides the movement of the valve body 29 and a seal portion 63b that seals the portion that is in sliding contact with the valve body 29. The guide member 63 is reinforced by a reinforcing ring 63c. The positional relationship between the valve body 29 and the guide member 63 is set so that, when the pneumatic booster 22 is in a stand-by position (see FIG. 2), the guide member 63 overlaps, at least partially, the opening 52a of the passage 52 that is formed in the valve body 29. The guide portion 63a of the guide member 63, which is in sliding contact with the valve body 29, is formed with a communicating passage 64 to provide communication between the passage 52 and the rear variable-pressure chamber 37 when the guide member 63 overlaps the opening 52a. The communicating passage 64 comprises a plurality of axial grooves which are formed in the inner periphery of the guide member 63 at predetermined spacings in the circumferential direction in the same way as in the case of the communicating passage 62 in the guide member 61.

The operation of the pneumatic booster 22 arranged as described above will be explained below.

Figure 1:
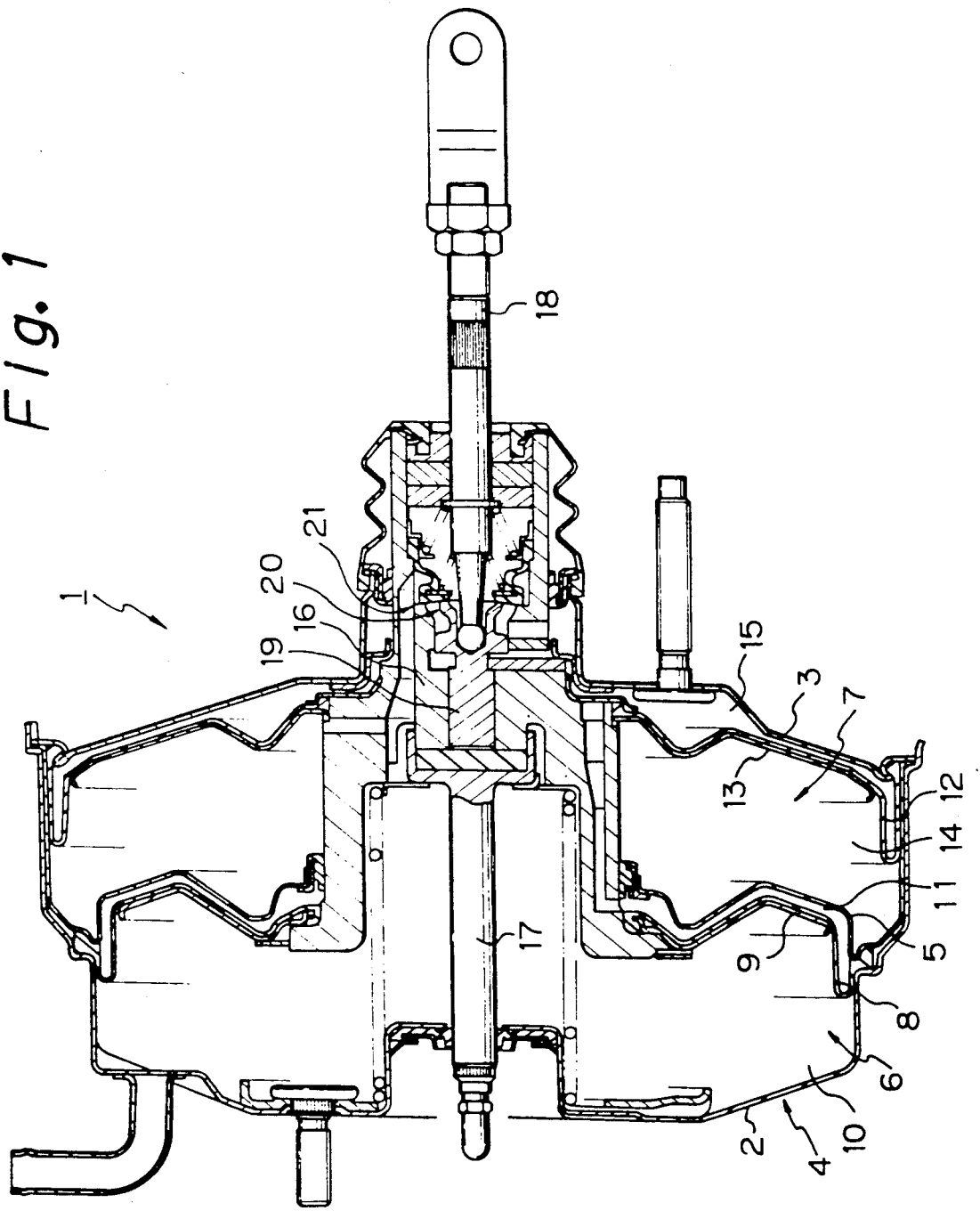
FIG. 1 is a sectional view of one example of conventional pneumatic boosters.
Figure 2:
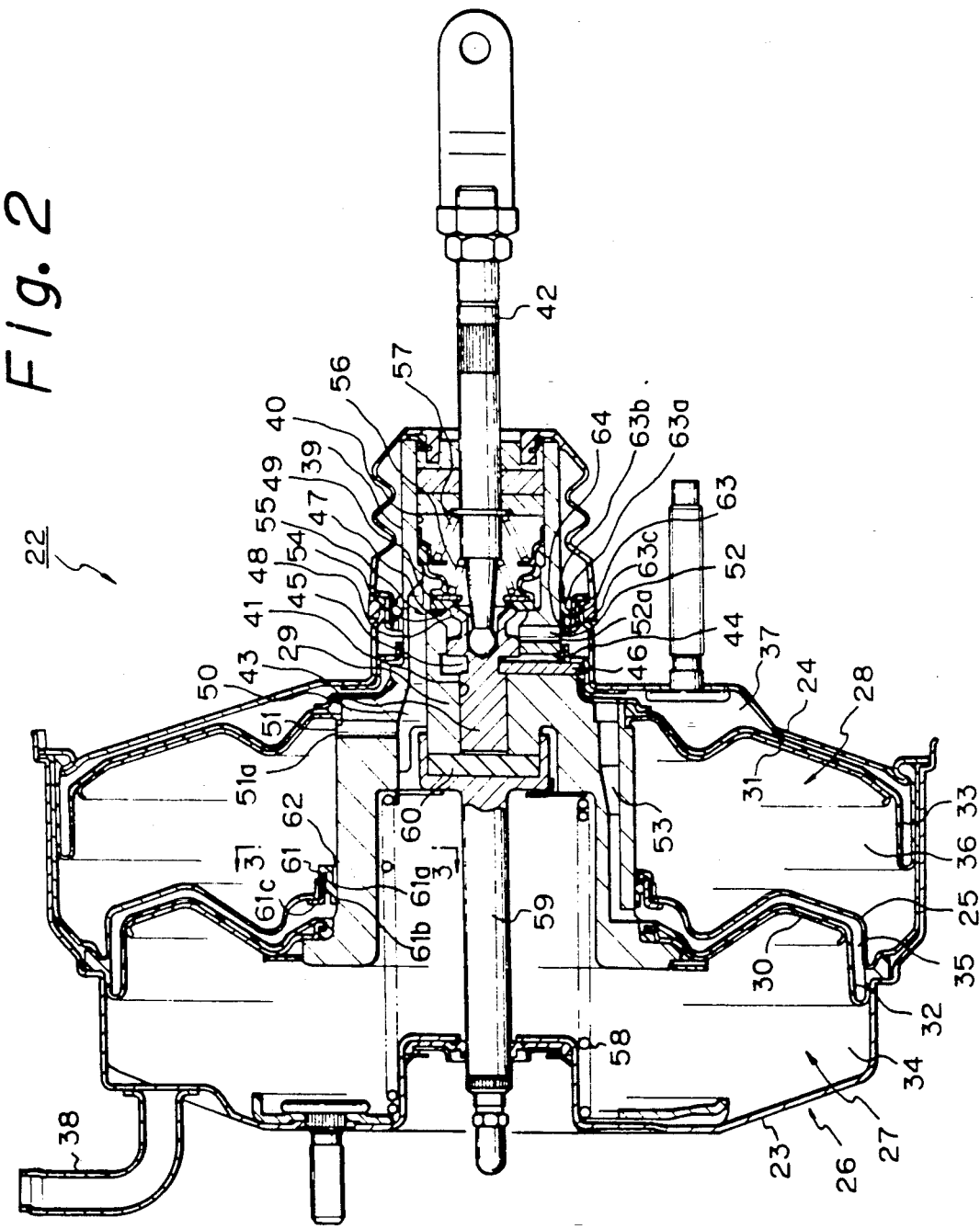
FIG. 2 is a sectional view of a first embodiment of the pneumatic booster according to the present invention.

When the input rod 42 moves forwardly as the brake pedal is stepped on, the plunger 43 in the pneumatic booster 22 that is in the stand-by position shown in FIG. 2 moves forwardly, causing the second valve seat 48 to separate from the valve member 49 to open the breather valve 54. In consequence, atmospheric air is introduced into the rear variable-pressure chamber 37 and the front variable-pressure chamber 35. As a result, a pressure difference is produced between each of the variable-pressure chambers 35 and 37 and the corresponding one of the constant-pressure chambers 34 and 36, so that the power pistons 30 and 31 move forwardly together with the valve body 29 and the output rod 59, thereby outputting boosted force to the master cylinder (not shown).

When the brake pedal is retained at the position where the brake pedal is stepped on, both the vacuum valve 55 and the breather valve 54 are closed and hence the output of boosted force to the master cylinder is maintained at a constant level.

Next, when the application of pressure on the brake pedal leases, the input rod 42 is moved rearwardly relative to the valve body 29 by the action of the conical spring 57, causing the valve member 49 to move rearwardly, with the second valve seat 48 being in contact with the valve member 49, so as to separate from the first valve seat 47 to open the vacuum valve 55. As a result, the variable-pressure chambers 35 and 37 communicate with the constant-pressure chambers 34 and 36 to form a negative pressure in each of the variable-pressure chambers 35 and 37, so that the valve body 29, together with the input rod 42, is moved rearwardly to return to the stand-by position by the force from the return spring 58 and the reaction force from the master cylinder.

The following points should be noted in regard to the pneumatic booster 22 having the above-described arrangement.

Since the opening 52a of the passage 52 that is formed in the valve body 29 overlaps the guide member 63 provided on the inner periphery of the rear end of the rear shell 24 when the pneumatic booster 22 is in the stand-by position, the axial length of the valve body 29 can be reduced by an amount corresponding to the overlap while the valve body 29 is supported over a length sufficient to guide it, that is, without reducing the length of the guide portion 63a of the guide member 63. At that time, the passage 52 and the rear variable-pressure chamber 37 are kept in communication with each other through the communicating passage 64 provided in the guide portion 63a, and therefore, when the breather valve 54 opens, the atmospheric air is introduced into the rear variable-pressure chamber 37.

In addition, since the opening 51a of the negative pressure passage 51 that is formed in the valve body 29 overlaps the guide member 61 provided on the inner periphery of the center plate 25 when the valve body 29 is at the extremity of its forward travel, the axial length of the valve body 29 can be reduced by an amount corresponding to the overlap while the valve body 29 is supported over a length sufficient to guide it, that is, without reducing the length of the guide portion 61a of the guide member 61. At that time, the front and rear constant-pressure chambers 34 and 36 are kept in communication with each other through the negative pressure passage 51 by virtue of the presence of the communicating passage 62 that is provided in the guide portion 61a.

Thus, the axial length of the valve body 29, that is, the pneumatic booster 22, can be reduced without interfering with the operation thereof by arranging the guide members 61 and 63 to overlap the respective openings 51a and 52a of the passages 51 and 52 and providing the communicating passages 62 and 64 that provide communication between the passages 51 and 52 and the chambers 36 and 37.

Next, second and third embodiments will be explained with reference to FIGS. 5 and 6. Since these embodiments are different from the first embodiment only in the configuration of the guide members, the relevant portions alone are illustrated. It should be noted that these guide members may be applied to either of the two guide members, that is, the one that is provided on the rear end portion of the rear shell 24, and the other that is provided on the inner periphery of the center plate 25.

Figure 5:
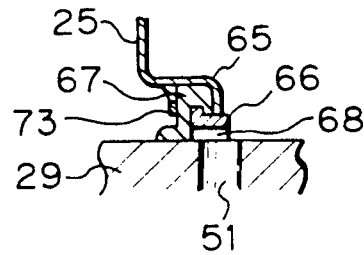
FIGS. 5 and 6 are enlarged sectional views of guide members which are employed in second and third embodiments, respectively, of the present invention.

In the second embodiment shown in FIG. 5, a guide member 65 that is provided on the inner periphery of the center plate 25 comprises a guide portion 66 that is in sliding contact with the outer periphery of the valve body 29 to guide it, the guide portion 66 being made of a rigid synthetic resin material, for example, phenolic resin material, and a seal portion 67 that seals the sliding contact surface of the guide portion 66, the seal portion 67 being made of a resilient material, for example, a rubber material. The seal portion 67 is formed to hang over the outer periphery of the guide portion 66, thereby joining together these two portions to greater in an integral structure. The guide portion 66 is formed with a communicating passage 68 that provides communication between the negative pressure passage 51 and the rear constant-pressure chamber 36. The communicating passage 68 also comprises a plurality of axial grooves which are formed in the inner periphery of the guide portion 66 at predetermined spacings in the circumferential direction in the same way as in the first embodiment. The guide member 65 is clamped by the end portion of the center plate 25 and a ring 73 that engages the center plate 25. The ring 73 has a plurality of grooves formed in the outer periphery thereof at predetermined spacings.

Figure 6:
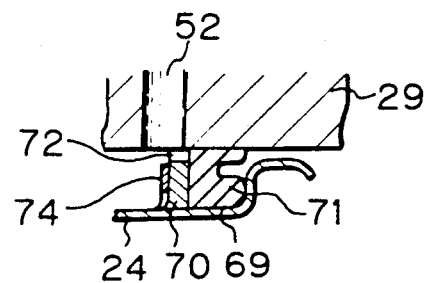

In the third embodiment shown in FIG. 6, a guide member 69 that is provided on the inner periphery of the rear end of the rear shell 24 comprises a guide portion 70 and a seal portion 71, which are abutted against each other to form an integral structure. The guide portion 70 is formed with a communicating passage 72 that provides communication between the passage 52 and the rear variable-pressure chamber 37. The guide member 69 is clamped by the end portion of the rear shell 24 and a ring 74 that engages the shell 24. The ring 74 has a plurality of grooves formed in the outer periphery thereof at predetermined spacings.

The functions of the guide members 65 and 69 shown in FIGS. 5 and 6 are the same as those shown in FIG. 2; therefore, description thereof is omitted.

As for the guide and seal portions, the arrangement may be such that the respective end portions of the inner peripheries of the center plate and the rear shell are defined as guide portions and a seal portion made of a resilient material is bonded to each of the guide portions. It is also possible to use a resilient material (e.g., rubber) having a high degree of hardness for the guide portions and a relatively soft resilient material (e.g., rubber) for the seal portions.

Although in the foregoing embodiments the present invention is applied to a tandem type pneumatic booster and the guide members 61 and 63 are arranged to overlap the respective openings 51a and 52a of the negative pressure passage 51 and the passage 52, it should be noted that either one of the guide members alone is arranged to overlap the corresponding opening. In addition, the application of the present invention is not necessarily limited to tandem type pneumatic boosters. For example, in a pneumatic booster that is provided with a single constant-pressure chamber and a single variable-pressure chamber, a guide member that is provided on the rear end portion of a rear shell may be arranged to overlap an opening of a passage that is formed in the valve body to allow the variable-pressure chamber to communicate with the atmosphere.

As has been detailed above, the present invention is arranged such that a guide member overlaps a passage that opens on the outer periphery of the valve body and a guide portion of the guide member is provided with a communicating passage that communicates with that passage. Accordingly, while the valve body is supported over a length sufficient to guide it, the axial length of the valve body can be reduced without interfering with the operation. Thus, it is possible to reduce the overall length of the pneumatic booster.

Although the present invention has been described through specific terms, it should be noted that the described embodiments are not necessarily exclusive and that various changes and modifications may be imparted thereto without departing from the scope of the invention which is limited solely by the appended claims.

What is claimed is:

1. A pneumatic booster comprising:
a housing;
a diaphragm with a power piston which is attached at the outer peripheral portion to said housing to divide the interior of said housing into a pair of front and rear chambers, which are communicated with respective pressure sources;
a valve body which is movable back and forth between first and second positions in said housing, said valve body having the inner peripheral portion of said diaphragm attached to the outer periphery thereof;
an input rod;
valve means which cooperates with said input rod to effect a switching operation to allow at least one of said front and rear chambers to selectively communicate with said pressure sources which differ from each other in the level of pressure thereof;
an output rod which is connected at one end thereof to said power piston; and
guide means which is provided on said housing to slidably fit on the outer periphery of said valve body;
said valve body being formed therein with a passage that constitutes a part of passage means for connecting one of said front and rear chambers to the pressure source associated therewith, one end of said passage opening on the outer periphery of said valve body so that said passage can communicate with said one chamber;
said opening of said passage being positioned in the axial direction of said valve body so that said guide means overlaps said opening when said valve body is at either said first or second position;
said guide means having a guide member that fits on the outer periphery of said valve body to slidably support it, and a seal member that fits on the outer periphery of said valve body slidably and hermetically;
said guide member having a plurality of axial grooves provided in the inner peripheral surface thereof at predetermined spacings in the circumferential direction so that said passage communicates with said one chamber through said grooves when said valve body is at either said first or second position where said guide means overlaps said opening.

2. A pneumatic booster according to claim 1, wherein said guide member and said seal member are formed from a resilient material into an integral structure.

3. A pneumatic booster according to claim 1, wherein said guide member is formed from a rigid material, while said seal member is formed from a resilient material.

4. A pneumatic booster according to claim 3, wherein said guide member and said seal member are bonded together in an integral structure.

5. A pneumatic booster according to claim 1, wherein said housing has a rear shell, said valve body extending to the outside of said housing through an opening formed in said rear shell, said guide means being attached to said opening in said rear shell, said passage forming a part of means for providing communication between said rear chamber and the pressure source associated therewith, and said guide means being arranged to overlap said opening when said valve body is at the extremity of its rearward travel.

6. A pneumatic booster according to any of claim 1, wherein said valve means effects a switching operation to allow said rear chamber to selectively communicate with said pressure sources which differ from each other in the level of pressure thereof.

7. A pneumatic booster according to claim 1, wherein said housing has a center plate that divides the interior of said housing into a pair of front and rear portions, said center plate having an opening that slidably receives said valve body, each of said front and rear portions being divided by a diaphragm with a power piston into a pair of front and rear chambers, said guide means being attached to said opening in said center plate, said front chamber in said front portion being communicated with the pressure source for said front chamber, said passage being communicated at one end thereof with said front chamber in said front portion, the other end of said passage opening on the outer periphery of said valve body to communicate with said front chamber in said rear portion, and said guide means being arranged to overlap said opening of said passage when said valve body is at the extremity of its forward travel.

8. A pneumatic booster according to claim 7, wherein said pressure source for said front chamber supplies a substantially constant pressure to said front chamber.

9. A pneumatic booster comprising:
a housing;
a diaphragm with a power piston which is attached at the outer peripheral portion to said housing to divide the interior of said housing into a constant-pressure chamber that is communicated with a negative pressure source and a variable-pressure chamber that is selectively communicated with said negative pressure source or the atmosphere by a switching operation;
a valve body which is movable back and forth in said housing between the extremity of its forward travel and the extremity of its rearward travel, said valve body having the inner peripheral portion of said diaphragm attached to the outer periphery thereof;
an input rod;
valve means which is provided in said valve body to cooperate with said input rod to effect a selective switching operation to allow said variable-pressure chamber to selectively communicate with said negative pressure source or the atmosphere;
an output rod which is connected at one end thereof to said power piston; and
guide means which is provided on said housing to slidably fit on the outer periphery of said valve body;
said valve body being formed therein with a passage one end of which opens to the outer periphery of said valve body to provide communication between said variable-pressure chamber and said valve means;
said opening of said passage being positioned in the axial direction of said valve body so that said guide means overlaps said opening when said valve body is at said extremity of its rearward travel;

said guide means having a guide member that fits on the outer periphery of said valve body to slidably support it, and a seal member that fits on the outer periphery of said valve body slidably and hermetically;

said guide member having a plurality of axial grooves provided in the inner peripheral surface thereof at predetermined spacings in the circumferential direction so that said passage communicates with said variable-pressure chamber through said grooves when said valve body is at said extremity of its rearward travel where said guide means overlaps said opening.

10. A pneumatic booster according to claim 9, wherein said housing has a rear shell, said valve body extending to the outside of said housing through an opening formed in said rear shell, said guide means being attached to said opening in said rear shell.

11. A pneumatic booster comprising:
a housing having a center plate that divides the interior thereof into a front chamber and a rear chamber;
diaphragms with respective power pistons which are attached at the outer peripheral portions thereof to said housing to divide each of said front and rear chambers into a constant-pressure chamber that is communicated with a negative pressure source and a variable-pressure chamber that is selectively communicated with said negative pressure source or the atmosphere by a switching operation;
a valve body which is movable back and forth in said housing between the extremity of its forward travel and the extremity of its rearward travel, said valve body having the respective inner peripheral portions of said diaphragms attached to the outer periphery thereof;
an input rod;
valve means which is provided in said valve body to cooperate with said input rod to effect a switching operation to allow said variable-pressure chamber in each of said front and rear chambers to selectively communicate with said negative pressure source or the atmosphere;
an output rod which is connected at one end thereof to said power pistons; and
guide means which is provided on said housing to slidably fit on the outer periphery of said valve body;
said valve body being formed therein with a passage one end of which is communicated with said constant-pressure chamber in said front chamber and the other end of which opens to the outer periphery of said valve body to communicate with said constant-pressure chamber in said rear chamber;
said guide means being attached to an opening provided in said center plate;
said opening of said passage being positioned in the axial direction of said valve body so that said guide means overlaps said opening when said valve body is at said extremity of its forward travel;
said guide means having a guide member that fits on the outer periphery of said valve body to slidably support it, and a seal member that fits on the outer periphery of said valve body slidably and hermetically;

said seal member having a plurality of axial grooves provided in the inner peripheral surface thereof at predetermined spacings in the circumferential direction so that said passage communicates with said constant-pressure chamber in said rear chamber through said grooves when said valve body is at said extremity of its forward travel.

12. A pneumatic booster according to claim 11, wherein said housing has a rear shell, said valve body extending to the outside of said housing through an opening formed in said rear shell, said valve body further having a second passage one end of which opens on the outer periphery of said valve body to provide communication between said variable-pressure chamber in said rear chamber and said valve means, said booster further comprising second guide means which is attached to said opening in said rear shell,
said opening of said second passage being positioned in the axial direction of said valve body so that said second guide means overlaps said opening of said second passage when said valve body is at said extremity of its rearward travel,
said second guide means having a guide member that fits on the outer periphery of said valve body to slidably support it, and a seal member that fits on the outer periphery of said valve body slidably and hermetically,
said guide member of said second guide means having a plurality of axial grooves provided in the inner peripheral surface thereof at predetermined spacings in the circumferential direction so that said second passage communicates with said variable-pressure chamber in said rear chamber through said grooves when said valve body is at said extremity of its rearward travel.

13. A pneumatic booster according to claim 12, wherein said valve body is further formed with a passage which provides communication between said variable-pressure chamber in said front chamber and said variable-pressure chamber in said rear chamber.

14. A pneumatic booster according to claim 2, wherein said valve means effects a switching operation to allow said rear chamber to selectively communicate with said pressure sources which differ from each other in the level of pressure thereof.

15. A pneumatic booster according to claim 3, wherein said valve means effects a switching operation to allow said rear chamber to selectively communicate with said pressure sources which differ from each other in the level of pressure thereof.

16. A pneumatic booster according to claim 4, wherein said valve means effects a switching operation to allow said rear chamber to selectively communicate with said pressure sources which differ from each other in the level of pressure thereof.

17. A pneumatic booster according to claim 5, wherein said valve means effects a switching operation to allow said rear chamber to selectively communicate with said pressure sources which differ from each other in the level of pressure thereof.

* * * * *